United States Patent [19]
McGregor

[11] 3,895,538
[45] July 22, 1975

[54] SLACK COMPENSATOR FOR BRAKE SYSTEMS

[76] Inventor: Donald T. McGregor, 8067 Monroe Ave., Stanton, Calif. 90680

[22] Filed: Nov. 22, 1974

[21] Appl. No.: 526,240

[52] U.S. Cl. .............................. 74/518; 188/79.5 K
[51] Int. Cl.² ...................... B60T 11/08; G05G 1/04
[58] Field of Search.......... 74/516, 518; 188/79.5 K, 188/79.5 GE, 196 B, 348

[56] References Cited
UNITED STATES PATENTS

| | | | |
|---|---|---|---|
| 2,445,630 | 7/1948 | Page ..................................... | 74/518 |
| 2,820,532 | 1/1958 | Coskun ........................... | 188/196 B |
| 3,217,558 | 11/1965 | Schroter ............................... | 74/516 |

*Primary Examiner*—Duane A. Reger
*Attorney, Agent, or Firm*—Lyon and Lyon

[57] ABSTRACT

A yoke arranged to be interposed between the brake lever and the rod which operates the lever, the yoke having spring retained means which on initial movement of the operating rod presses against a midportion of the lever to effect increased movement of the brake lever with respect to movement of the operating rod until the slack in the brake system has been taken up whereupon the full length of the lever is utilized to complete the braking operation.

8 Claims, 8 Drawing Figures

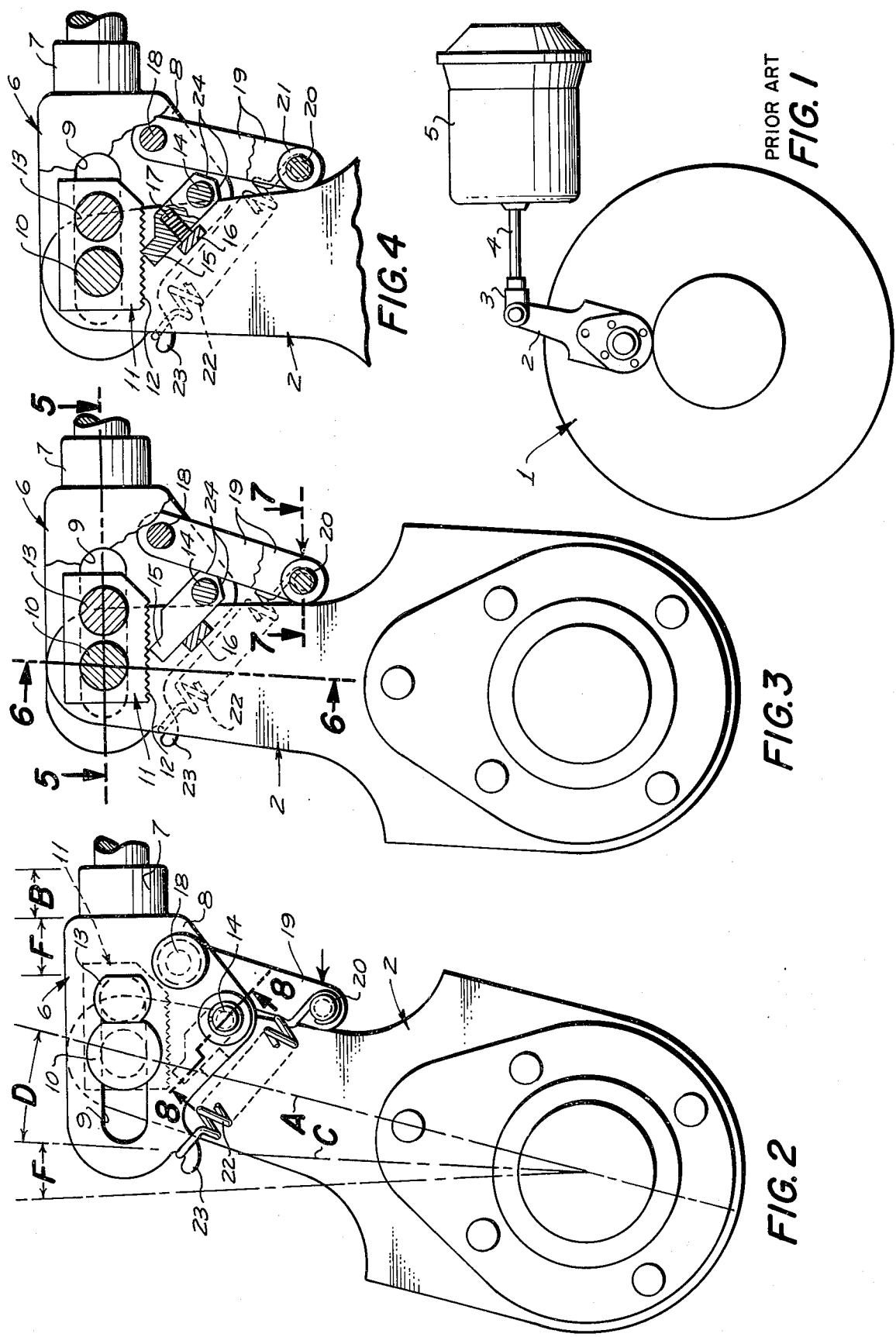

SLACK COMPENSATOR FOR BRAKE SYSTEMS

BACKGROUND AND SUMMARY OF THE INVENTION

Various slack adjustment devices for brakes have been used, however, none insofar as known, have proven satisfactory. The present invention is directed to a slack compensator which may be readily incorporated in an otherwise conventional brake system and is summarized in the following objects:

First, to provide a slack compensator which is in the form of a novel yoke adapted to be readily interposed between a conventional brake lever and an operating rod therefor; the compensator being adapted to move the lever initially through an increased arc with minimal movement of the operating rod; then, when resistance to movement is increased as the slack is taken up, the operating rod functions to apply the brake with normal rod movement.

Second, to provide a slack compensator as indicated in the other objects, which is particularly adapted for use in conjunction with spring brakes, for due to decreased spring operated brake rod travel as well as reduced change in the brake rod movement due to brake wear, the expansion of the brake spring is reduced so that adequate braking force is maintained without requiring excess compression of the spring.

Third, to provide a slack compensator as indicated in the other objects, which is also particularly adapted for use in conjunction with air brakes, as the reduction in required movement of the air brake diaphram reduces wear of the diaphram, and also the attendant reduction in the amount of air required reduces maintenance of the air compressor.

Fourth, to provide a slack compensator as indicated in the other objects which compensates for wear of the brake lining or expansion of the brake system due to heating, this being accomplished without increasing brake lining wear, for adequate clearance may be maintained between the brake drum and its lining.

DESCRIPTION OF THE FIGURES

FIG. 1 is a fragmentary essentially diagrammatical view showing one type of conventional brake system which may utilize the slack compensator.

FIG. 2 is a side view of a brake actuating lever and adjacent portion of its operating rod joined by the slack compensator, the slack compensator being shown in the position assumed when the brakes are fully disengaged.

FIG. 3 is a similar view showing the slack compensator in position wherein the slack has been taken up.

FIG. 4 is a similar view with the brake lever shown fragmentarily and showing the slack compensator in its final position when the brake has been applied.

Figure 5:
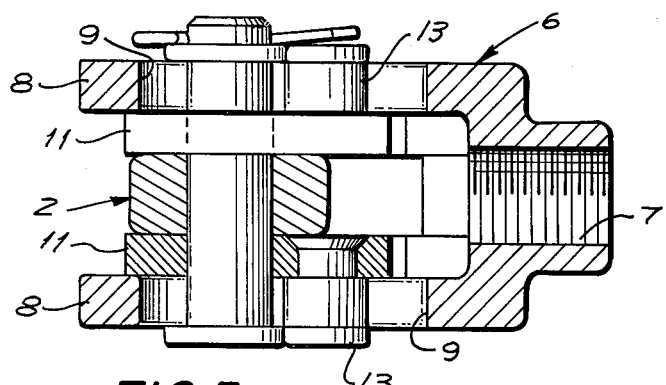
FIG. 5 is an enlarged transverse sectional view taken through 5—5 of FIG. 3.
Figure 6:
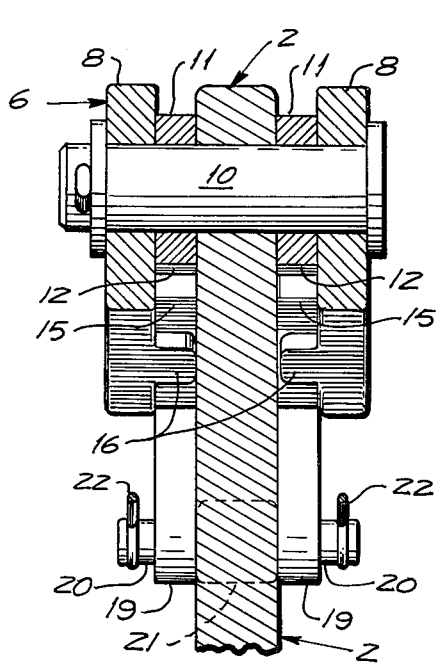
FIG. 6 is an enlarged fragmentary sectional view taken through 6—6 of FIG. 3.
Figure 7:
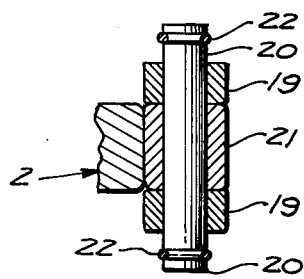
FIG. 7 is a fragmentary sectional view taken through 7—7 of FIG. 3.
Figure 8:
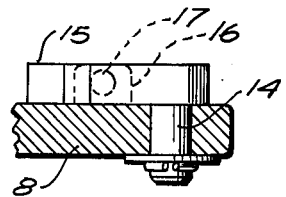
FIG. 8 is a fragmentary sectional view taken through 8—8 of FIG. 2.

One type of conventional brake system which may utilize the slack compensator is shown in FIG. 1. The brake system includes a brake 1 actuated by a brake lever 2 which is joined by a clevis 3 to an operating rod 4 extending from a spring brake actuator 5. In place of the spring brake actuator, an air brake or an hydraulic brake or a manually operated brake may be substituted.

The slack compensator includes a clevis 6 which is substituted for the conventional clevis 3. The clevis 6 includes a screwthreaded fitting 7 which is joined to the operating rod 4. The clevis also includes a pair of side plates 8 which fit over the sides of the brake lever 2 in spaced relation thereto. The side plates 8 are provided with slots 9 which in the construction illustrated, define a plane which is common to the longitudinal axis of the operating rod 4. The slots 9 may deviate from such a position but do define a plane which is fixed with respect to the operating rod 4.

The slots 9 receive a cross pin 10 which is journaled in the extremity of the brake lever 2 in place of the conventional journal pin for the clevis 3. Interposed between the side plates 8 and the brake lever 2, is a pair of ratchet plates 11 which are rectangular in form and are provided at their lower sides with ratchet teeth 12. The ratchet plates 11 are perforated to receive the cross pin or journal pin 10. In addition, the ratchet plates have second apertures which receive alignment pins 13 fitted in the slots 9 so that the ratchet plates may slide a limited distance in the slots 9.

The side plates 8 depend below the ratchet plates 11 and are provided with journal pins 14 which support pawl levers 15. The pawl levers extend upwardly in angular relation to the ratchet plates 11 for engagement with the ratchet teeth 12. Each side plate 8 is provided with a stop lug 16 which hold the pawl levers 15 in an angular position directed toward the ratchet piece 12. Each pawl lever 15 is provided with a spring 17 which urges the pawl lever away from its stop lug to cause engagement with the ratchet teeth 12.

Positioned adjacent the fitting 7 and under the plane defined by the slots 9 is a journal rod 18 from which extends a pair of downwardly directed thrust levers 19. The extremities of these thrust levers 19 are joined by a connector pin 20 which carries a roller 21 positioned for engagement with the side of the brake lever 2.

A pair of tension springs 22 extend along opposite sides of the brake lever 2 between hook elements 23 provided in the side plates 8 and the extremities of the connecting pin 20.

The intermediate portions of the thrust levers 19 engage cam surfaces 24 provided at the journaled extremities of the pawl levers 15.

Operation of the slack compensator is as follows:

When the brakes are disengaged, each brake lever 2 occupies an angular position represented by A passing through the journal axis of the lever and the cross pin or journal pin 10 as shown in FIG. 2. In this position, the springs 22 fix the roller firmly against the side of the brake lever 2 intermediate its ends, also the thrust levers 19 engage the cam surfaces 24 to hold the pawl levers 15 clear of the ratchet teeth 12.

When the operating rod or shaft 4 is moved a preliminary distance presented by B in FIG. 2, the journal pin 10 moves to the angular position indicated by C in FIG. 2. This position is the same as shown in FIG. 3. The angular movement between the position shown in FIG. 2 and the position shown in FIG. 3 is represented by the arc D indicated in FIG. 2. The extent of this arc is greater than would be the case if the operating rod 4 was bearing directly against the journal pin 10. That is, by reason of the fact that the thrust levers 19 are held against the pawl levers 15, the effect on the brake lever 2 is as if the thrust levers 19 were rigidly fixed with respect to the operating rod 4 and the lever arm represented by the brake lever 2 was shortened to the distance between the axis of the lever and the axis of the connecting pin 20 and roller 21. The springs are pretensioned as to resist the force required to move the brake band or disk up to its position of engagement with the brake band or brake disk. That is, to resist movement until all slack has been compensated. This is the position shown in FIG. 3.

Continued movement of the operating shaft 4 first causes the thrust levers 19 to disengage the cam surfaces 24 of the pawl levers 15 so that the pawl levers engage the ratchet teeth 12 as shown in FIG. 4. Continued movement of the operating shaft 4 causes an arcuate movement of the brake lever 2 determined by the distance between the axis of the brake lever and the ratchet teeth 12. This added movement of the shaft 4 is represented by the distance E in FIG. 2 and corresponds to the arcuate movement F.

Stated otherwise, during movement of the brake in which slack is taken up, the operating shaft movement to brake arm movement is approximately two to one, whereas during actual application of the brake, the movement is relatively a one-to-one ratio.

Having fully described my invention, it is to be understood that I am not to be limited to the details herein set forth, but that my invention is of the full scope of the appended claims.

I claim:

1. A slack compensator adapted to be interposed between a brake lever having a journal pin and an operating shaft of a vehicle brake system, the slack compensator comprising:
   a. a clevis structure forming a drive connection between the operating shaft and the brake lever including slots for receiving the journal pin;
   b. a ratchet and pawl means, the ratchet means being movable with the journal pin and guided by the slots, the pawl means being pivotally attached to the clevis structure;
   c. thrust lever means pivotally connected to the clevis structure and engageable with the brake lever at an intermediate point between its pivotal axis and the ratchet means to reduce the effective length thereof; the thrust lever means also engageable with the pawl means to hold the pawl means clear of the ratchet means;
   d. and spring means initially fixing the thrust lever means against the brake lever to transmit a thrust from the operating shaft to the brake lever at said intermediate point thereby to cause increased rotation of the brake lever per unit of movement of the operating shaft;
   e. the spring means being yieldable to a predetermined force exerted by the operating shaft through the thrust lever means against the brake lever to cause release of the pawl means for engagement with the ratchet means thereby to cause decreased rotation of the brake lever per further unit of movement of the operating shaft.

2. A slack compensator as defined in claim 1, wherein:
   a. the clevis structure includes a pair of plate elements at opposite sides of the brake lever;
   b. and a pair of ratchet and pawl means are interposed between each plate element and brake lever.

3. A slack compensator as defined in claim 2, wherein:
   the thrust lever means includes a pair of lever elements disposed in the planes of the pawl means and a cross bar connecting the lever elements and engaging the brake lever;
   b. and a pair of tension springs extend between the plate elements and thrust lever means.

4. A slack compensator adapted to be interposed between a brake lever and an operating shaft of a vehicle brake system, comprising:
   a. a clevis structure including means for attachment to the operating shaft;
   b. a journal pin for the brake lever;
   c. a ratchet means mounted on the journal pin and fixed in general alignment with the operating shaft;
   d. a pawl means pivotally mounted on the clevis structure for engagement with the ratchet means;
   e. thrust means pivotally mounted on the clevis structure for thrust engagement with the brake lever intermediate the ratchet means and the brake lever axis and also engageable with the pawl means to hold the pawl means clear of the ratchet means;
   f. yieldable means exerting a predetermined thrust force on the thrust means whereby initial movement of the operating shaft causes the thrust means to apply movement to the brake lever intermediate the ratchet means and brake lever axis thereby to move the brake lever through a corresponding arc for each unit of movement of the operating shaft;
   g. said yieldable means being responsive to a force greater than said predetermined force to cause the thrust means to release the pawl means for engagement with the ratchet means to apply a force directly thereto thereby to move the brake lever through a reduced arc for each further unit of movement of the operating shaft.

5. A slack compensator as defined in claim 4, wherein:
   a. the clevis structure supports the ratchet means in general alignment with the operating shaft and the ratchet means is capable of essentially longitudinal movement relative to the operating shaft to permit initial movement of the operating shaft.

6. A slack compensator as defined in claim 4, wherein:
   a. the clevis structure includes a pair of plate elements having slots to receive the journal pin and to guide the ratchet means for essentially longitudinal movement relative to the operating shaft to permit said initial movement thereof;
   b. a pair of ratchet means and pawl means are interposed between the brake lever and side plates;
   c. the thrust means includes a pair of levers disposed in alignment with the pawl means, and a cross bar to engage the brake lever;
   d. and the yieldable means is a pair of tension springs extending across opposite sides of the brake lever between the side plates and the extremities of the cross bar.

7. A slack compensator for vehicle brake systems having an operating shaft, the compensator comprising:
   a. a brake lever;

b. a clevis structure adapted for connection to the operating shaft and pivotally and slidably connected to the brake lever in a plane approximately coinciding with the axis of the operating shaft;
c. yieldably biased means carried by the clevis structure engageable with the brake lever intermediate its extremities thereby to provide a relatively short lever arm for effecting initial movement of the brake lever to take up such slack as may be present in the brake system beyond the brake lever;
d. means adjacent the pivotal connection between the brake lever and clevis structure to provide a relatively long lever arm for effecting final movement of the brake lever.

8. A slack compensator as defined in claim 7, wherein:
a. the spring biased means includes thrust lever means and spring means initially providing a fixed thrust connection between the operating shaft and the brake lever;
b. and a ratchet and the means adjacent the pivotal connection is a ratchet and pawl means.

* * * * *